Oct. 4, 1927.
A. P. DAVIS ET AL
1,644,311
CABLE CONNECTER
Filed Nov. 29, 1926
2 Sheets-Sheet 1
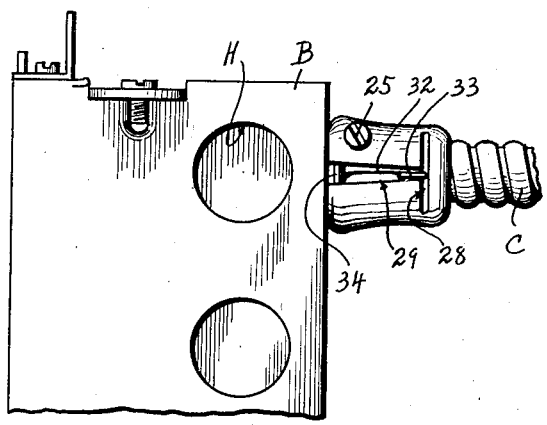
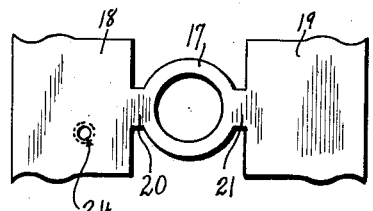
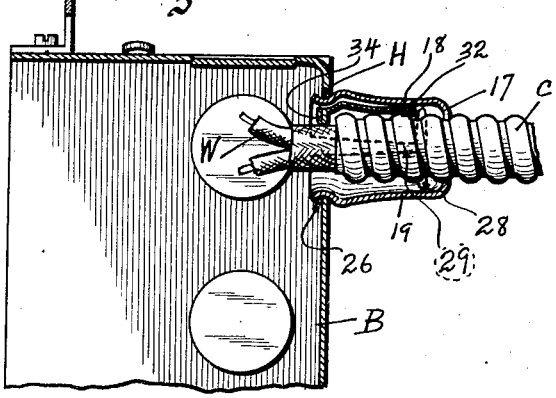
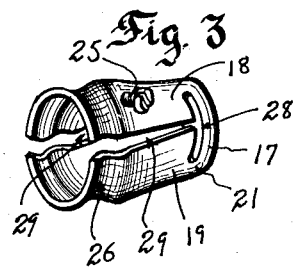
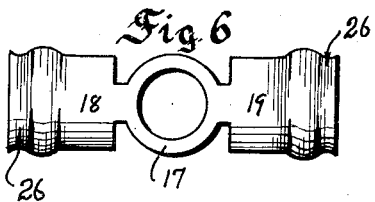
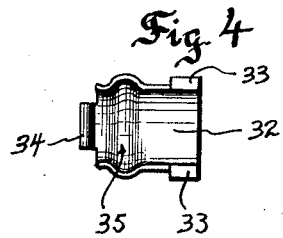
INVENTORS
Alexis P. Davis & Stephen N. Buchanan
BY
Bohleber & Ledbetter
ATTORNEYS Oct. 4, 1927.
A. P. DAVIS ET AL
1,644,311
CABLE CONNECTER
Filed Nov. 29, 1926        2 Sheets-Sheet 2
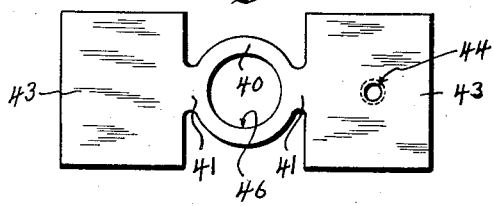
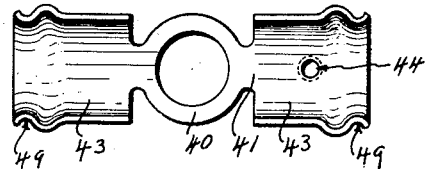
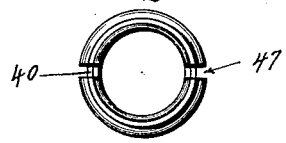
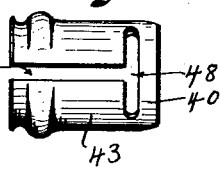
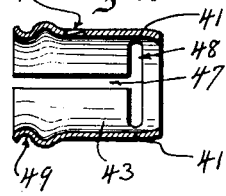
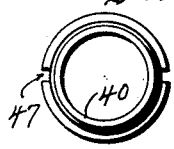
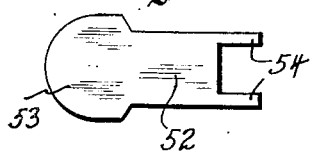
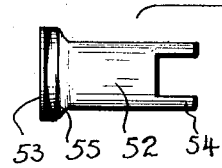
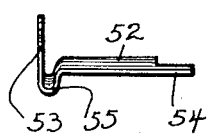
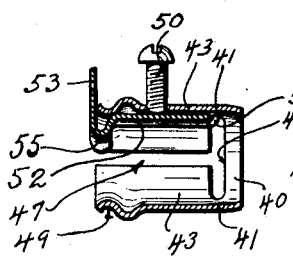
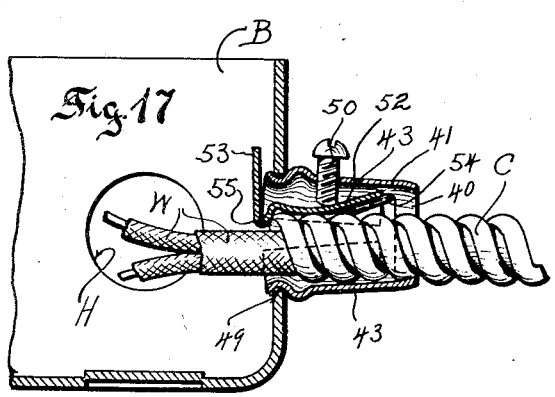
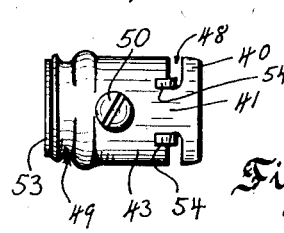
INVENTORS
Alexis P. Davis & Stephen N. Buchanan
BY
Bohleber & Ledbetter
ATTORNEYS Patented Oct. 4, 1927.

1,644,311

UNITED STATES PATENT OFFICE.

ALEXIS P. DAVIS, OF BALTIMORE, MARYLAND, AND STEPHEN N. BUCHANAN, OF NEW YORK, N. Y., ASSIGNORS TO THE THOMAS & BETTS CO., OF ELIZABETH, NEW JERSEY, A CORPORATION OF NEW JERSEY.

CABLE CONNECTER.

Application filed November 29, 1926. Serial No. 151,587.

This invention relates to cable connecters and this application is a continuation in part of our former application for patent Serial Number 24,578 filed April 20, 1925.

An object of the invention is to improve cable connecters in respect to the construction of the connecter member itself, i. e. the frame preferably of sleeve form which carries the several movable operating parts whereby a unique sleeve or equivalent part can be readily produced from a flat stamping with one end thereof expandible to anchor itself in a box hole.

Also it is an object to produce an adapter connecter for use with various styles and types of cable such as round or flat cable, large or small size cable, and armored or unarmored cable.

A further object is to improve the connecter in respect to the adapter element which is employed as a sleeve closing means or as a box hole closing means, and to improve the adapter by including with it a cable bearing clamp plate attached in a novel way to the sleeve whereby the clamp plate cooperates with operating means as a screw to grip the cable and simultaneously anchor the connecter in a box hole.

The above and other objects are attained by our invention and the accompanying drawings illustrate one or more examples of the improved connecter.

The first six figures illustrate that connecter shown in the former application Serial Number 24,578, while the latter Figures 7 to 17 illustrate certain improvements thereover.

Figure 1 shows an outside box view with the connecter anchored thereto and securing a cable to the box.

Figure 2 shows a sectional view taken longitudinally through the connecter anchored to the box with the cable secured in the connecter.

Figure 3 shows the connecter member in sleeve form with an operating means such as a screw mounted therein, forming a complete connecter.

Figure 4 is a detailed view of a sleeve liner cable clamp plate adapted to be used with the sleeve connecter, and which is in effect an adapter by which one sleeve of standard size is converted to use with different sizes of cable.

Figure 5 shows a metal stamping from which the connecter sleeve is made.

Figure 6 is a plan view showing the ends of the Figure 5 stamping pressed into semi-circular form.

The remaining views, Figures 7 to 16 inclusive, show an improved form of connecter, more particularly adapter improvements which includes a cable bearing clamp plate, means to retain the adapter in position on or in the connecter member, and a shutter to close a box hole or sleeve end. A unique feature resides in a bushing portion set into the adapter between the shutter and clamp plate. The sleeve is the same as disclosed in our former application, i. e. in the first six views.

Figure 7 is a plan view of the stamping from which the connecter member, for example the sleeve, is made; and Figure 8 is an inside view of this stamping after its end parts have been fashioned into semi-circular form.

Figure 9 shows a view of the inner end of the connecter sleeve; and Figure 10 shows a side view thereof.

Figure 11 shows a longitudinally sectional view through the connecter sleeve; and Figure 12 shows the outer end.

Figures 13 and 14 show improvements in what may be called the adapter which includes a shutter to close a box hole and a sleeve end, and which also includes an improved bearing clamp plate together with a bushing; Figure 13 being the flat stamping, and Figure 14 illustrating the top, side, and end elevation of the finished adapter.

Figure 15 shows the connecter assembled with the operating means, as well as the adapted mounted in the sleeve; and Figure 16 is a plan view of the complete connecter.

Figure 17 shows a general box view in longitudinal section with the connecter and cable secured to the box.

Reference is first made to Figures 1 to 6 inclusive which illustrate the first form of our connecter on which the latter improvements in the adapter are based.

Cable connecters are used to attach cable C to outlet or fixture boxes B. Boxes B are provided with knockout holes H for the reception of a connecter and cable and the wires W are led through the connecter into the box and electrical connections are made on the inside of the box in the usual way.

Describing first the structure of the connecter member which preferably assumes the form of a sleeve-like member acting as a frame or base to carry the movable parts, and referring to Figures 5 and 6, there is shown a sheet metal stamping comprising what may be called rectangular shaped ends 18 and 19 joined in opposite relation to a center ring piece 17 which ultimately forms the end of the sleeve when the stamping is finished. Although the ring 17 may, in the early stages of the forming up of process, have a small internal diameter which is enlarged during the forming process, we have here shown its center cut out to provide it in the first instance with an inside size large enough to receive the cable C. The ring is joined at opposite points by necks 20 and 21 to the respective end parts 18 and 19. The necks 20 and 21 and the ring therefore form the outer sleeve end.

It is noted how the narrow necks 20 and 21 join the flat stamping parts 18 and 19 to the ring 17 and these necks are preferably reduced to such size that a relatively small though sufficient amount of malleable bending stock is retained so that bending motion may occur through the necks to permit the two end parts to be bent into parallel relationship and ultimately fashioned into sleeve form. Figure 6 shows an outside view of the Figure 5 stamping with end parts 18 and 19 pressed into semi-circular form and Figure 3 shows the connecter member completed in sleeve form by bending the stamping ends on the necks 20 and 21 to fashion the stamping into final shape.

Operating means is provided to grip the cable C in the connecter and to cause the connecter to anchor itself to the box and also to hold the adapter liner in place and clamped against a cable. For this purpose a screw hole 24 is made in one of stamping parts as 18, and a screw 25 is mounted therein. Preferably the screw 25 is mounted in the member substantially in line with the bending neck so that the bending strain exerted against the neck by the screw more easily applies itself. Suitable box hole edge anchorage or engaging means is carried with the member and as an example thereof a groove 26 is pressed into one or both parts 18 and 19, say at the end thereof. The grooves 26 are adapted to expand in the box hole H and thus anchor the connecter in the box B.

In fashioning the flat stamping of Figure 5 into ultimate sleeve form of Figure 3, the end ring 17 is caused to be slightly spaced apart from the adjacent ends of the semi-circular sleeve members by opposite circumferential slots 28. There are also opposite longitudinal slots 29 which split the connecter from the inner grooved end 26 back to a point proximate the outer end, i. e. back to the ring 17. Thus longitudinal slot 29 bisects or connects centrally with the circumferential slot 28. In fact the two slots form what might be called a connecter T-slot 28—29, the head of T-slot being 28 and disposed at the outer end of the sleeve 18—19, while the stem 29 of T-slot extends through the anchorage groove 26 so that the sleeve is divided into two sections 18 and 19 and is thus capable of being expanded to anchor the connecter in a box.

There are two sleeve dividing T-shaped slots 28—29, one disposed oppositely to the other. In effect, the two necks 20 and 21 separate the two T-slots and this construction places the unique slot formation opposite one to the other and disposes the necks 20 and 21 opposite one to the other. In this way the ring 17 defines the outer rigid end of the sleeve but permits the inner grooved end 26 to be contracted in order that the connecter may be snapped into the box and then expanded to anchor it in the box.

These improvements in respect to the connecter member enables a well-balanced strong sleeve to be made from a plain flat stamping wherein the extreme outer end of the sleeve is solid or is continuous in its full-fashioned unsplit form, but the remainder of the sleeve is longitudinally split and circumferentially split to make the sleeve pliable in order that it may easily open and close. The solid circular ring 17 forms a smooth circular end opening for the reception of the cable and prevents the cable from inadvertently coming into contact with the outer end edges and corners of the sleeve parts.

The connecter sleeve 18—19 shown in Figure 3 may be used with certain kinds of cable as for example armored cable without the liner shown in Figure 4 and when so used, the screw 25 turns toward and against the cable C to grip and clamp it in the sleeve and to simultaneously cause the flexible groove end 26 to expand to thereby anchor the connecter in the box B. However, it is frequently necessary because of requirements of fire underwriters or other rules to use an adapter liner, an example of which is shown in Figure 4 and it acts as a bearing clamp plate to avoid spreading or crushing of the armor on the cable C which might occur in case the screw 25 bears directly against said armor. Also the liner carries a bushing to protect the wires W from the sharp jagged end of the cable. The liner aids in forming a well closed sleeve. It is useful in several particulars.

With reference to the adapter clamp plate sleeve liner, it is preferably made semi-circular in form and is provided with retaining ears 33 on one end thereof. The other end of the clamp plate liner 32 is provided with a turned down portion forming in part a circular or semi-circular bushing 34 against which the end of the cable C rests in the sleeve. Likewise this end of the clamp plate is grooved or corrugated as at 35 adjacent the bushing 34 to conform to the grooved or corrugated shape 26 of the sleeve 18—19. In other words the liner 32 is corrugated to match that of the sleeve groove 26 so that the portions 25 and 26 may lie in close relation and thus avoid taking up too much space inside the sleeve.

The clamp plate liner 32 is mounted movably in the sleeve with the ears 33 disposed in the lengthwise slots 29 and adjacent or across the circumferential slots 28. This arrangement of parts places the bushing 34 towards the inner expanding end of the sleeve where it can be readily pressed down against the insulation on the wires W. The ears 33 aid in retaining the clamp plate liner 32 in the sleeve and the bushing 34 at the other end is freely movable to bear against the wires to protect them from being damaged by the sharp cable end which stops against the bushing 34. The body of the liner 32 lies about the cable C, or partly therearound and the screw 25 is run down against the liner. In this way the clamp plate liner 32 is interposed between the cable C and the end of screw 25 so as to protect the cable from the screw. The screw forces the liner towards the center of the sleeve bearing it against the cable C to grip and clamp the cable between the sleeve and liner and fix the cable in the sleeve. This operation also causes the grooved end 26 to expand and thereby anchor the connecter in the box hole H.

The foregoing description is directed to that example of our invention disclosed in the former patent application Serial Number 24,578; and an important feature of our former application is the sleeve with its novel slot and ring end construction. Our later improvements which continue from the former application relate largely to an improved adapter bearing clamp plate and bushing and its ability to readily combine with the same sleeve as above described.

As shown in Sheet 2, a ring sleeve end 40 is joined by oppositely disposed necks 41 to stamped sleeve plates 43, and a screw hole 44 is made in one of the sleeve plates 43, preferably in line with one of the necks. The one or more necks 41 are flexible and thereby permit the sleeve plates 43 to be bent in relation to the ring 40 so as to dispose the ring at one end to form a rigid sleeve end. The sleeve plates 43 are first pressed into semi-circular form and then bent on the necks to form a sleeve with the ring 40 at right angles to the sleeve axis. The ring 40 may be swedged inside out, i. e. turned so that the inner ring circumference 46 Figure 7 becomes the outer sleeve end edge 46 Figure 11.

Oppositely disposed T-shaped slots 47—48 are formed in the sleeve and the ends of the circumferential slot 48 are defined or separated by the opposite necks 41 and 42. In other words, the necks 41 separate what would otherwise be a continuous circumferential slot 48 into one or more oppositely disposed short circumferential slots 48. A box hole edge anchorage groove 49 is pressed into the inner end of one or both sleeve parts 43 and is adapted to engage the box hole edge H and thus anchor the connecter and its movable parts in the box.

Referring now to Figures 13 and 14, there is shown an improved adapter cable clamp. We refer to this part as an adapter since it is used to convert a one standard size sleeve connecter for use with various size or shape cable and at the same time closes the sleeve and closes a standard size box hole against discharge of fire sparks or entry of dirt or plaster. It is clear enough that when a small size cable such as cable C in Figure 17 is used with the connecter 43 that considerable space may be left in the sleeve opening through the box hole H by reason of the small size cable not completely filling the sleeve. We therefore provide improvements by way of shutter means 53 to close the sleeve or box hole or both. At the same time the shutter is carried with a cable clamp 52 to protect the cable armor from the end of a screw 50 mounted in the screw hole 44; and a bushing portion 55 is also provided on the adapter.

The adapter clamp comprises a cable clamp plate 52 carrying a circular shutter end 53 on one end and retaining ears 54 parallel and spaced apart on the other end. The spaced retaining ears 54 hook into the two circumferential sleeve slots 48 with the neck 41 therebetween, i. e. the ears 54 straddles one of the sleeve necks 40 which is preferably in line with a screw 50 threaded through the connecter member. The ears 54 are bent up through the slots 48 and back over the outside of the sleeve as shown in Figure 16 to positively hold the adapter clamp in the sleeve. The shutter end 53 is bent at an angle or preferably at right angles to the clamp plate 52 and includes a semi-circular bushing member 55 interposed between the clamp plate 52 and shutter 53. The bushing 55 is in effect carried on the lower edge of the shutter 53. Thus the adapter shown in Figures 13 and 14 comprises ears on one end, a shutter 53 and bushing 55 on the other end, with a cable bearing clamp plate 52 in the middle.

The shutter 53 overhangs the sleeve end and is movable up and down close to the end edge of the sleeve and this closes the sleeve and box hole, or closes that part of the sleeve and box hole which is not occupied by the cable C. The shutter 53 is sufficiently long to close the sleeve above the cable no matter how far the clamp plate 52 is run down in the sleeve by the screw 50 to clamp against the cable. For small cable, the shutter may move way down towards the center of the sleeve as in Figure 17, while for large cable the shutter or closure plate 53 may stand high up above the sleeve as shown in Figure 15. The shutter end is movably free of the sleeve by reason of the ears 54 functioning as hinges.

The screw 50 runs down against the clamp plate 52, and thus clamps the cable C in the connecter and at the same time the screw acts to hold the shutter 53 in place over the end of the sleeve to close it; and the bushing 55 is held against the wire W and over the end of the cable C by the closed shutter. Likewise the screw also causes the connecter sleeve 43 to expand and anchor itself in the box hole. Thus the screw operating means, a single operating part, performs several functions.

The connecter fulfills a long felt want for a suitably constructed sleeve, one that may be used with or without an adapting cable clamp plate, and fills the need of a suitably constructed adapter which performs the many purposes described. Furthermore, there is combined in one stamped adapter clamp, the several elements composing it.

The novel slot formation in the sleeve with the neck and ring means enables the sleeve to be economically manufactured and makes it flexible for installation. One or more necks and one or more longitudinal-circumferential slots may be used for these purposes.

What we claim is:

1. A connecter comprising, a member including a ring integral at one end thereof to receive a cable, box hole anchorage means proximate the other end of the member, a circumferential slot in part separating the ring from the member, and operating means to clamp against a cable and to engage the anchorage means within a box hole.

2. A connecter comprising, a sleeve provided with a circumferential slot at one end forming a continuous ring, including means rendering the other sleeve end expansible, box hole edge anchorage means carried with the expansible end, and operating means to clamp against a cable and expand the anchorage means.

3. A connecter comprising, a sleeve provided with opposite circumferentially aligned slots defining a continuous ring at one end of the sleeve, means rendering the other sleeve end expansible, box hole anchorage means carried with the expansible end, and operating means to clamp against a cable.

4. A connecter comprising a sleeve, a ring at one end and being separated from the sleeve by two oppositely disposed circumferentially aligned slots defining the ring, said sleeve provided with longitudinal slots connecting with the ring defining slots, box hole anchorage means provided in the sleeve and cut by the longitudinal slots, and clamping means carried with the connecter to grip a cable and expand the anchorage means.

5. A connecter comprising, a sleeve, a neck at one end thereof, a ring integral with the neck at right angles to the sleeve axis, box hole anchorage means at the sleeve end opposite the neck, a longitudinal slot cutting through the sleeve and anchorage means, and a screw threaded through the sleeve to grip a cable and expand the anchorage means.

6. A connecter comprising, a sleeve including box hole anchorage means, necks at one end equidistantly spaced apart, a ring integral with the two necks and spaced from the sleeve end, longitudinal slots provided in the sleeve cutting through the anchorage means and connecting with the space adjacent the ring at points between the necks, and operating means to grip a cable and expand the sleeve.

7. A connecter comprising, a sleeve provided with a box hole edge engaging groove at one end thereof, oppositely disposed longitudinal slots provided in the sleeve and cutting through the groove and extending through the other sleeve end, a ring at the other end of the sleeve, oppositely disposed necks integral with the ring and sleeve to attach the solid ring onto the split sleeve, and operating means to clamp a cable and expand the sleeve groove.

8. A connecter comprising, a sleeve provided with a box hole anchorage groove proximate one end, a ring carried at the other end including two oppositely disposed necks integrally joining the ring to the sleeve, two longitudinal slots cutting the sleeve from end to end, each slot being disposed between the necks, and a screw threaded through the sleeve to grip a cable and expand the sleeve.

9. A connecter comprising, a member including box hole edge anchorage means; and connecter adapter means including, a shutter plate movable at an angle to the member, hooks engaging the member, and means carrying the shutter in spaced relation from said hooks; and operating means to apply pressure to the adapter means to grip against a cable and close the shutter.

10. A connecter comprising, a member including box hole edge anchorage means; and connecter adapter means including, a shutter plate movable at an angle to the member, a bushing formed on that inner edge of the shutter which moves toward a cable, hooks engaging the member, and means carrying the shutter and bushing in spaced relation from said hooks; and operating means to apply pressure to the adapter means to grip against a cable and close the shutter.

11. A connecter comprising, a sleeve including box hole edge anchorage means; and connecter adapter means including, a shutter plate movable at an angle to the sleeve, hooks engaging the sleeve, and means carrying the shutter in spaced relation from said hooks; and operating means to apply pressure to the adapter means to grip against a cable and close the shutter.

12. A connecter comprising, a sleeve including box hole edge anchorage means; and a connecter adapter including a shutter slidably mounted over one sleeve end, a bushing carried and movable with the shutter, and means retaining the adapter in the sleeve; and operating means to deliver pressure to the adapter to grip a cable, to close the shutter, and press the bushing against wires.

13. A connecter comprising, a sleeve including box hole edge anchorage means; and a connecter adapter including a shutter slidably mounted over one sleeve end, a bushing carried and movable with the shutter, a clamp plate integral with the shutter and bushing, and means hingedly connecting the clamp plate to the sleeve; and operating means to deliver pressure to the clamp plate, to close the shutter, and press the bushing against wires.

14. A connecter comprising, a sleeve including box hole edge anchorage means; an adapter movably mounted on the sleeve including, a cable clamp plate, hooks at the plate end curving around one end of the sleeve, and a shutter formed at the other end of the plate slidable at the connecter end to close that sleeve end which is opposite the hooks; and operating means to deliver pressure to the clamp plate and close the shutter.

15. A connecter comprising, a sleeve including box hole edge anchorage means; an adapter movably mounted on the sleeve including, a cable clamp plate, hooks at the plate end curving around one end of the sleeve, and a shutter formed at the other end of the plate slidable at the connecter end to close that sleeve end which is opposite the hooks; a ring including neck means attaching it to the sleeve end adjacent the adapter hooks, and operating means to deliver pressure to the clamp plate and close the shutter.

16. A connecter comprising, a sleeve provided with expansible box hole edge engaging means and split longitudinally and circumferentially by slotting means, a neck integral with the sleeve attaching a closed ring thereto, a clamp plate including means at one end hooking it into the circumferential slot astride the neck, a shutter plate included on the other end of the clamp plate slidable over the sleeve end, a bushing formed on the shutter plate edge proximate the sleeve axis; and operating means to expand the box hole engaging means, to deliver pressure on the clamp plate, to close the shutter, and force the bushing against wires.

17. A connecter comprising, a member including box hole edge anchorage means, a ring at one end including a neck carrying the ring at right angles to the member; and connecter adapter means including, a clamp plate movable in relation to the member, hooks straddling the neck between the ring and member to attach the adapter to the member, and a box hole closing shutter; and operating means carried with the member to deliver pressure against the clamp plate and close the shutter.

18. A connecter comprising, a member including box hole edge anchorage means, a ring at one end including a neck carrying the ring at right angles to the member; and connecter adapter means including, a clamp plate movable in relation to the member, hooks on one end of the clamp plate engaging the member, and a bushing on the other end, and a box hole closing shutter; and operating means carried with the member to deliver pressure against the cable clamp plate and close the shutter.

19. A connecter comprising, a member including box hole edge anchorage means, a ring at one end including a neck carrying the ring at right angles to and spaced from the member; and connecter adapter means including, a bearing clamp plate disposed parallel to and movable in relation to the member, hooks at one end of the plate straddling the neck in the space between the ring and member, a bushing at the other end of the plate, and a box hole shutter at the same end of the plate with the bushing; and operating means carried with the member to deliver pressure against the clamp plate and close the shutter.

20. A connecter comprising, a sleeve including box hole edge anchorage means, a ring at one end including a neck carrying the ring at right angles to and spaced from the sleeve; and connecter adapter means including, a bearing clamp plate disposed parallel to and movable in relation to the sleeve, hooks at one end of the plate straddling the neck in the space between the ring and sleeve, a bushing at the other end of the plate, and a box hole shutter at the same end of the plate with the bushing; and operating means carried with the sleeve to deliver pressure against the clamp plate and close the shutter.

In testimony whereof we affix our signatures.

ALEXIS P. DAVIS.
STEPHEN N. BUCHANAN.